Figure 1:
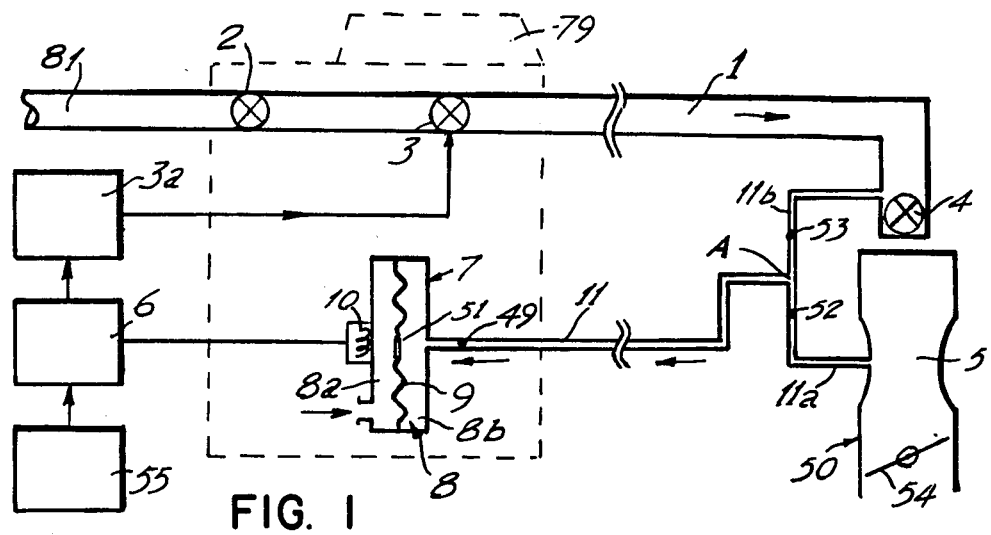

United States Patent [19]

Bruce

[11] 4,188,919
[45] Feb. 19, 1980

[54] FLUID REGULATING SYSTEMS

[75] Inventor: Howard D. Bruce, Dublin, Ireland

[73] Assignee: Laser-Grade (Ireland) Limited, Dublin, Ireland

[21] Appl. No.: 751,370

[22] Filed: Dec. 16, 1976

[51] Int. Cl.² .............................................. F02B 3/00
[52] U.S. Cl. ................................ 123/32 EA; 123/120; 123/32 EE
[58] Field of Search .......... 123/120, 139 AW, 32 EA, 123/32 EE; 261/63 A, 59 A; 137/487.5, 486

[56] References Cited

U.S. PATENT DOCUMENTS

| Re. 29,383 | 9/1977 | Gallatin | 137/487.5 |
|---|---|---|---|
| 1,931,791 | 10/1933 | Dueringer | 137/487.5 |
| 1,942,793 | 1/1934 | Bailey | 137/486 |
| 2,862,162 | 11/1958 | Baring | 137/486 |
| 3,583,374 | 6/1971 | Scholl | 123/32 EA |
| 4,040,403 | 8/1977 | Rose | 123/139 AW |
| 4,043,300 | 8/1977 | Lombard | 123/32 EE |

Primary Examiner—Ronald H. Lazarus
Attorney, Agent, or Firm—Strimbeck & Soloway

[57] ABSTRACT

A fluid regulating system has an electro-fluidic control loop in which a fluid control pressure indicative of the relationship between an existing fluid condition and a demand signal acts in opposition to a bias pressure on a control member forming part of a transducer, to provide an electrical output representative of the instantaneous position of the control member. The electrical output is arranged to control a regulating device and so regulate the existing fluid condition in the sense to maintain the fluid control pressure substantially constant. The fluid regulating system has advantageous application to metering of L.P.G. to the carburation system of an internal combustion engine.

17 Claims, 7 Drawing Figures

FLUID REGULATING SYSTEMS

This invention relates to fluid regulating systems in which a fluid condition, such as pressure or volume flow, can be regulated automatically to maintain a predetermined relationship with a variable demand signal.

Such systems comprise basically a sensing arrangement for sensing the relationship between an existing fluid condition and a demand signal, and a regulating device controlled by an output from said sensing arrangement for regulating the fluid condition if it departs from a predetermined relationship with the demand signal whereby to restore said predetermined relationship.

The fluid regulating system of the invention is intended to have particular, but not exclusive, application in supplying vaporised hydrocarbon fuel (known as LPG—liquified petroleum gas) such as propane, to internal combustion engines. In this application the demand signal can be caused to manifest itself continuously as a fluid pressure related to the engine running condition and throttle setting, for example by use of a venturi in the inlet to the engine upstream of the throttle.

The primary object of the invention is to provide an electro-fluidic regulating system suitable for regulating the supply of LPG to internal combustion engines.

According to the invention the sensing arrangement of the regulating system has means for deriving a fluid control pressure indicative of the relationship between an existing fluid condition and a demand signal, a control chamber in which said fluid control pressure acts in opposition to a bias pressure on a movable control member, said control member forming part of a transducer, whereby an electrical output representative of the instantaneous position of said control member is continuously produced by the sensing arrangement, and said regulating device is arranged to be controlled by said electrical output whereby to regulate the existing fluid condition in such manner that said fluid control pressure is maintained substantially at a constant value.

Preferably said control member comprises a flexible diaphragm whose elastic rate is substantially constant, so that its deflection from a rest position is proportional to the applied differential pressure across it, the diaphragm carrying a member whose position is detected by the sensing arrangement.

Said control member may form part of an impedance device, for example an inductive or capacitive device which modulates an alternating current wave-form in dependence upon the position of said control member to provide said electrical output. A detector circuit would then convert the modulated wave-form to an analogue representation. Alternatively said transducer may comprise an electro-optical device, which operates with DC and produces the analogue representation directly. Said analogue representation may then be used to control the energization of a solenoid operated proportional flow controller constituting said regulating device.

In applying the regulating system of the invention to the carburation system of an internal combustion engine using LPG in order to regulate the volume flow of LPG, said fluid control pressure can be derived by relating a negative pressure derived from a venturi upstream of a carburettor throttle with a positive pressure in the LPG supply line. This can be effected by detecting directly the pressures in the venturi and supply line. Alternatively the supply line may be connected to the carburettor in such manner that the required fluid control pressure is automatically set up in the supply line.

As will be appreciated from the ensuing description, petrol carburation systems can be adapted by a simple conversion for use with LPG using the regulating system of the invention, and where the ability to still operate with petrol as an alternative fuel source is preserved.

Figure 7:
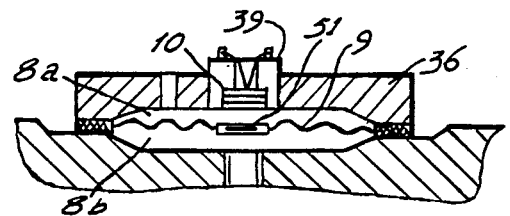
Figures 2, 3:
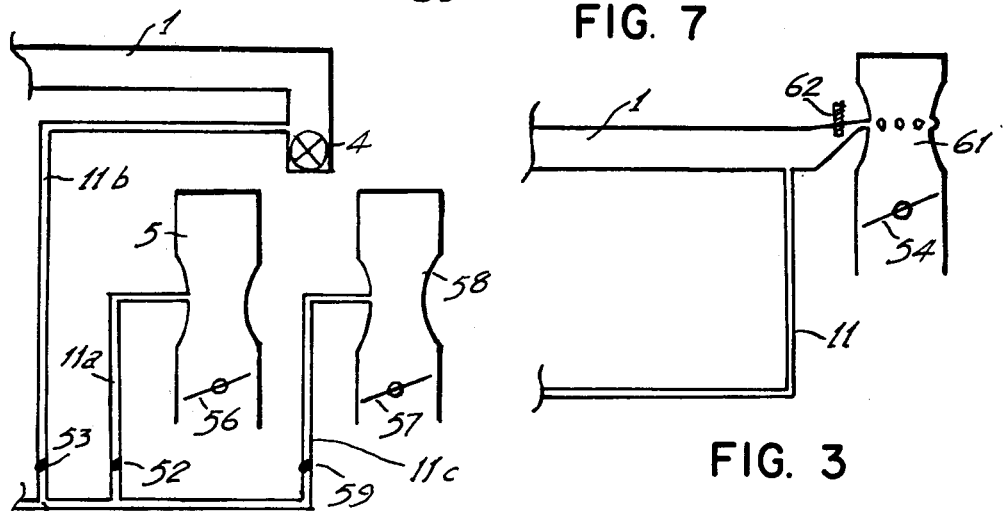
Figure 4:
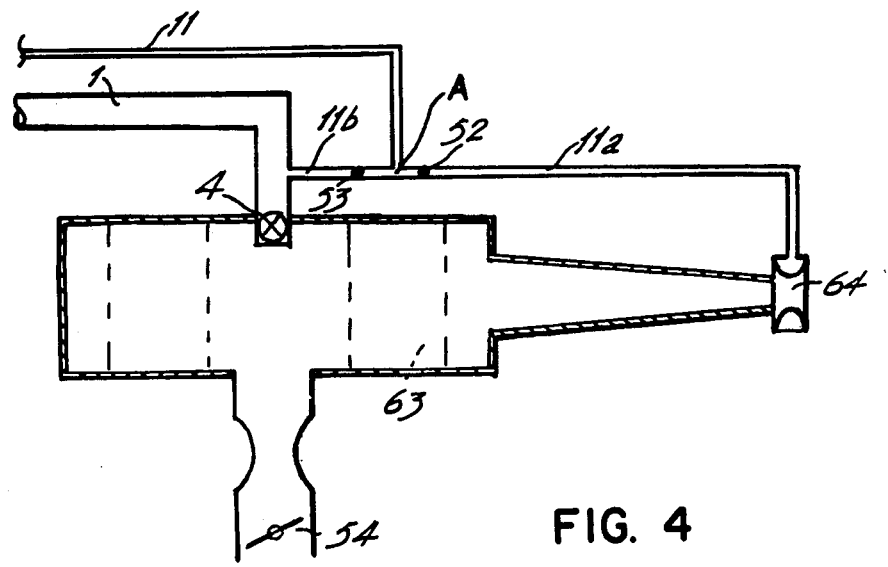
Figure 5:
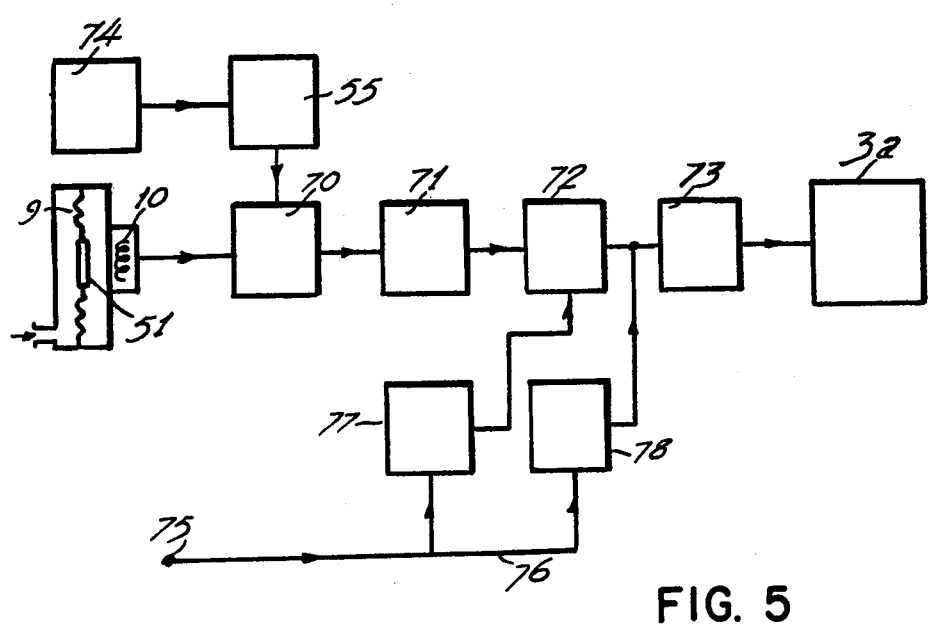

The invention will now be further described by way of example with reference to the accompanying drawings, in which:

FIG. 1 is a schematic diagram of a fluid regulating system in accordance with the invention and as applied to the conversion of a conventional petrol carburettor for use with LPG, FIG. 2 is a schematic diagram showing how the system of FIG. 1 is applied to the conversion of a compound petrol carburettor for use with LPG, FIG. 3 is a schematic diagram of a fluid regulating system in accordance with the invention as applied to an LPG carburettor, FIG. 4, is a schematic diagram of a further fluid regulating system in accordance with the invention, FIG. 5 shows a block circuit diagram of the electronic part of the regulating system which is common to the systems of FIGS. 1 to 4, FIG. 6 is an exploded view showing the mechanical design of the regulating system, and FIG. 7 is a cross section showing the mechanical design of the sensing arrangement.

Referring to FIG. 1, a supply line 81 is arranged to feed LPG from a storage tank (not shown) to a primary pressure regulator 2. From the regulator 2 the LPG flows through a proportional flow solenoid valve 3 and into a supply line 1 which has at its outlet an injection nozzle 4 which is positioned in the normal air intake of a petrol type carburettor 50 above the carburettor venturi 5.

The solenoid 3a of the valve 3 is connected to the output of an electronic control unit 6 which in turn is controlled by a pressure sensing arrangement 7 (see also FIG. 7) comprising a control chamber 8, a low silicone rubber diaphragm 9 mounted in the chamber 8 under slight tension and a sensing coil 10 which senses the distance from it of a slug 51 mounted at the centre of the diaphragm 9. By use of a low-silicone rubber a constant elasticity, i.e. a constant rate diaphragm, can be provided.

The diaphragm 9 divides the chamber 8 into sub-chambers 8a and 8b. The sub-chamber 8a is vented to atmosphere, thus providing a bias or reference pressure acting on one side of the diaphragm. The chamber 8b is connected to line 11 which contains a damping jet 49 and branches into lines 11a and 11b containing jets 52 and 53 which may be of equal or different size. The line 11a leads via a small drilling into the waist of the carburettor venturi 5 and the line 11b leads into the gas supply line 1. Thus a negative pressure is created in line 11a related to the negative pressure at the waist of the venturi 5 and a positive pressure is created in line 11b related to the pressure in supply line 1. The negative pressure in line 11a is a measure of engine demand since it is dependent upon engine running condition and the setting of throttle 54 and hence constitutes a demand signal. The positive pressure in line 11b is a measure of volume flow in relation to the demand signal. The negative and positive pressures are summed effectively at point A and the resultant pressure is fed via line 11 to subchamber 8b and hence acts on the diaphragm in opposition to the bias pressure in sub-chamber 8a.

Referring now to FIG. 2, this shows an adaptation of the system of FIG. 1 to a compound carburettor, in which the throttle 56 is fully opened before the throttle 57 is opened. In this case the line 11 has an additional branch 11c leading via a small drilling into the waist of the second venturi 58 and containing a jet 59. Otherwise the system of FIG. 2 is the same as that of FIG. 1.

Referring now to FIG. 3, this shows a carburation system designed for use solely with LPG. In this system the supply line 1 leads to the waist of the carburettor venturi 61 and contains a main mixture screw 62 which together with the pressure in line 1 determines the idling mixture. The line 11 is not branched but leads directly into the supply line 1. Thus a pressure is created in the line 11 which is related to the pressure in line 1 and is therefore indicative of the existing relationship between the demand signal as determined by the negative pressure in the venturi 61 and the volume supply along line 1. Otherwise the system is the same as FIG. 1.

Referring to FIG. 4 this shows a modification of the system of FIG. 1, in that the demand signal is measured in the air inlet to the carburettor upstream of an air cleaner 63 by the provision of a separate venturi 64. Otherwise the system is the same as that of FIG. 1.

Referring now to FIG. 5, this shows a block circuit diagram of the control unit 6 and the associated sensing arrangement 7 and solenoid 3a of valve 3.

The sensing coil 10 forms part of an RF oscillator 70 whose output is modulated in dependence upon the spacing of the slug 51 from the coil 10. If the slug is of certain metals this will cause amplitude modulation and if of ferrite will cause frequency modulation since it will vary the inductance of the coil 10 rather than its Q. The output from the RF oscillator is fed to a detector 71 which converts the modulated output from the oscillator 70 to an analogue representation. The output from the detector 71 is fed to an integrator 72 whose purpose is to provide the necessary integration of the analogue signal to maintain stability of the electro-fluidic loop of which it forms part. The output of the integrator is fed to a power amplifier 73 for providing the necessary level of energisation for the solenoid coil 3a. The biasing unit 55 is shown controlling the RF oscillator and will thus control the level of modulation for a given spacing of the slug 51 from the coil 10. The bias control 55 is in turn controlled by a temperature control unit 74 so that its applied bias to oscillator 70 is also dependent upon temperature. This is advantageous in very cold starting conditions for the engine.

The regulating system thus comprises an electro-fluidic loop in which the difference between the pressures in the subchambers 8a and 8b is in proportion to the bias setting of bias control 55 and the open loop gain of the electro-fluidic loop.

The energization circuit (not shown) of the control unit 6 is for example from the engine battery. A line 76 leads from a contact breaker contact 75 of the engine distributor to an enhancement circuit 77 whose output is fed to the integrator 72. The circuit 77 provides a pulse of short duration to the integrator upon the commencement of pulses from the engine distributor. This short duration pulse in turn causes the output of the integrator effectively to increase the energization of the solenoid 3a momentarily and therefore increase the gas supply along supply line 1 in the form of a puff of gas at nozzle 4. This is very advantageous for engine starting.

The line 76 from the contact 75 also leads to a disable circuit 78, so that energization of the solenoid is turned off in the absence of pulses from the engine distributor, thus providing a positive shut down of the LPG supply.

In operation of the regulating system, the open loop gain is very high i.e. for a very small deflection of the diaphragm the change in output from the power amplifier is relatively very large. Hence for any given demand signal the diaphragm will be set in an equilibrium position which is for practical purposes always the same so that the pressure at point A remains constant.

In setting up the regulating system the size of the injection nozzle 4 is selected to have a desired relationship with the cross-sectional area of the waist of the venturi 5 and the size of the jets 52 and 53 are selected to have a predetermined relationship with each other and with the size of the injection nozzle 4 to determine the main air/fuel mixture. The bias unit 55 is set with the engine idling so that an air/fuel ratio of the idling mixture is set producing a desired low CO emission exhaust from the engine. It will be appreciated that this will set the pressure at point A at a certain value.

If the demand signal varies for example by adjustment of the throttle 54, this will cause a variation in the pressure at point A which will cause a change in the differential pressure between chambers 8a and 8b and the diaphragm 9 will move in response to this change. Since the movement is damped by the damping jet 49, the rate of movement is determined by the change in pressure. The movement of the diaphragm and hence of the slug 51 causes a variation in modulation of the RF output from oscillator 70 and this in turn will cause the integrater 72 to change its state of charge and thus change the energisation current of solenoid 3a to vary the flow of gas in the sense to return the pressure at A towards its original value. As this original pressure is approached the diaphragm will be returned to almost its original position and the integrator will now hold its new charge value as long as the demand signal remains the same.

Figure 6:
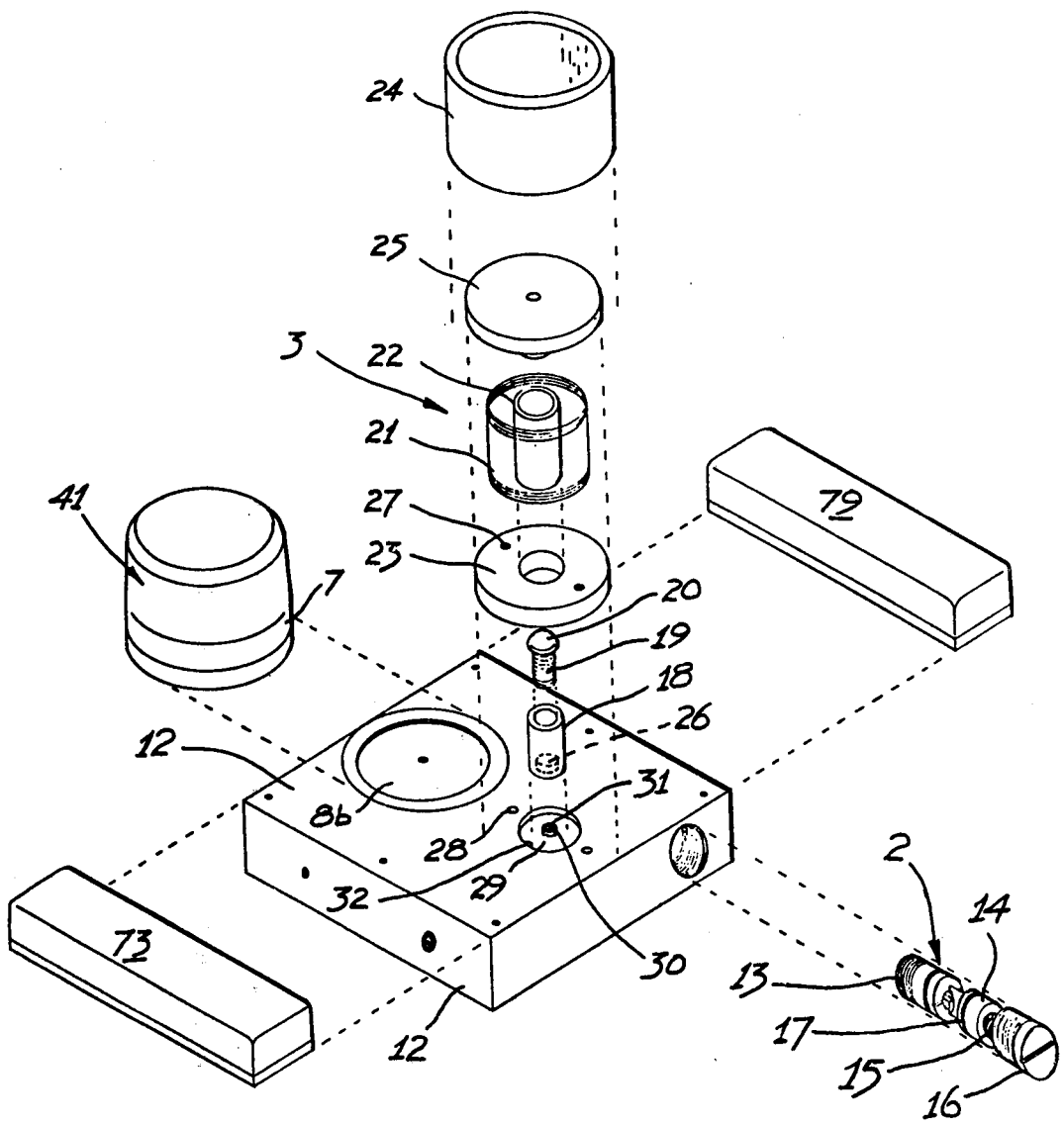

Referring now to FIGS. 6 and 7 these show the mechanical design of the solenoid control valve and the associated sensing arrangement and control unit. On a main support block 12 is mounted the primary pressure regulator 2 and the proportional flow solenoid valve 3. The sensing coil 10 of the sensing arrangement 7 and the electronic control unit 6 except for the power amplifier 73 form an assembly referenced generally 41. The main support block 12 of necessity incorporates a portion of the gas supply line 1 and of the line 11.

The primary pressure regulator 2 is of substantially conventional construction and comprises a ball valve 13, plunger 14, spring 15 and retaining cap 16. The plunger 14 is not however, of conventional construction and is provided with seating for O ring 17 which instead of having conventional rectangular construction is undercut on it trailing side to allow the O ring to move somewhat in the groove thus reducing wear on the O ring and the mechanical hysteresis of the plunged 14.

The proportional flow solenoid valve 3 comprises an armature 18 biased by a spring 19 having a cap 20. The armature 18 is housed within a coil 21 wound on former 22. The assembly is retained in position by a solenoid base 23, solenoid outer housing 24 and solenoid top 25. The armature is recessed at its lower end to receive a disc-type rubber sealing member 26.

The solenoid base 23 is provided with a pair of threaded holes 27 for engagement with bolts (not shown) which project through holes 28 in the main support block 12. A chamber 29 is provided in the support block 12 and has inlet port 31. A valve seating 30 surrounds the outlet orifice of the port 31. The chamber 29 is provided with an outlet port 32. The chamber 29 is fed with LPG from the main gas supply line 81 (FIG. 1) which passes through the primary pressure regulator 2 and into the chamber 29 through the port 31. The gas exits into the supply line 1 through the port 32. A set screw not shown is mounted in a threaded hole 35 in the solenoid top 25 and engages the cap 20 for adjustment of the bias spring 19.

The sensing arrangement 7 has a cover 36 (see FIG. 7) which clamps the diaphragm 9 around its periphery to the main support block 12 over a chamber provided in the block which thus constitutes sub-chamber 8b. The diaphragm 9 is of convoluted shape and is provided with an inner portion in which is encased a metal washer forming the flug 51. The diaphragm 9 is stretched when it is clamped in position so that it is biased towards a central position. The sensing coil 10 which is of conventional construction is mounted within a casing 39 in the cover 36.

The proportional flow solenoid valve 3 operates as follows. In the unenergized condition of the solenoid the armature is pressed downwardly by the bias spring 19 so that the sealing member 26 engages the seating 30 to close the port 31. When the solenoid is energized from control unit 6 it lifts the armature 18 against the bias spring 19. As the armature 18 lifts, gas passes under the armature 18 from the port 31 and into the chamber 29.

The volume of gas flowing will depend upon the spacing of the armature from the port 31 and this in turn will depend upon the level of energization of the solenoid.

An electric heater unit 79 is mounted on the support block 12 to provide a source of heat for vaporising LPG from the liquid state.

I claim:

1. A regulating system for regulating the flow rate of a gaseous fluid along a supply line for meeting a variable demand, especially for regulating the supply of gaseous fuel to the carburation system of an internal combustion engine, comprising:
   (a) a regulating device connected to said supply line;
   (b) a first feed-back line leading from said supply line and providing a first, positive pressure indicative of the actual flow rate of said fluid in said supply line;
   (c) a second feed-back line connected to a demand detecting device and providing a second, negative pressure indicative of the demanded flow rate;
   (d) a junction between said first and second feed-back lines at which said first and second pressures are summed to provide a resultant control pressure in a third line leading from said junction; and,
   (e) a control arrangement having
      (i) a control chamber divided into sub-chambers by a diaphragm means, said third line leading to one of said sub-chambers so that said control pressure acts on one side of said diaphragm in opposition to a bias pressure acting on the other side of said diaphragm, and
      (ii) a diaphragm position senser comprising a proximity device carried by said diaphragm, and an electric senser whose output controls said regulating device, the output of said electric senser varying in dependence upon the proximity of said device to it to vary the setting of said regulating device.

2. A fluid regulating system according to claim 1, wherein said senser forms part of an impedance device connected in an alternating current circuit to modulate an alternating current wave-form in dependence upon the position of said proximity device.

3. A fluid regulating system according to claim 1, wherein said regulating device comprises a solenoid operated proportional flow controller whose electrical energization is controlled by said electrical output.

4. A fluid regulating system according to claim 1 wherein said bias pressure is at a substantially constant value.

5. A fluid regulating system according to claim 4, wherein said bias pressure is atmospheric pressure.

6. In combination with the carburation system of an internal combustion engine arranged to be supplied with LPG, an LPG supply line leading into said carburation system, and a second, feed-back line connecting with a venturi in said carburation system to provide a negative pressure in said second, feed-back line, a regulating system connected in said supply line for regulating the flow rate of LPG along said supply line for meeting variable demands of said engine, said regulating system comprising:
   (a) a first feed-back line leading from said supply line and providing a first, positive pressure indicative of the actual flow rate of said fluid in said supply line;
   (b) a second feed-back line connected to a demand detecting device and providing a second, negative pressure indicative of the demanded flow rate;
   (c) a junction between said first and second feed-back lines at which said first and second pressures are summed to provide a resultant control pressure in a third line leading from said junction; and,
   (d) a control arrangement having
      (i) a control chamber divided into sub-chambers by a diaphragm means, said third line leading to one of said sub-chambers so that said control pressure acts on one side of said diaphragm in opposition to a bias pressure acting on the other side of said diaphragm, and
      (ii) a diaphragm position sensor comprising a proximity device carried by said diaphragm, and an electric senser whose output controls said regulating device, the output of said electric senser varying in dependence upon the proximity of said device to it to vary the setting of said regulating device.

7. A fluid regulating system according to claim 2, wherein said impedance device comprises an inductive device whose characteristic is varied in dependence upon the proximity of said proximity device to modulate the alternating wave-form of an R.F. oscillator.

8. A fluid regulating system according to claim 2, including means for feeding said modulated alternating current wave-form from said oscillator to a detector to provide an analog output representative of the position of said proximity device.

9. A fluid regulating system according to claim 8, wherein the output from said detector is arranged to be fed to an integrator.

10. A fluid regulating system according to claim 9, wherein the output from said integrator is arranged to control the output level of a power amplifier whose output is arranged to energize said regulating device.

11. A fluid regulating system according to claim 2, including a bias unit for adjusting the level of modulation of said alternating current wave-form for a given position of said proximity device.

12. A fluid regulating system according to claim 6, wherein said engine is a spark ignition engine controlled from a distributor, and including a disable circuit arranged to shut down said regulating device in the absence of pulses from said distributor.

13. A fluid regulating system according to claim 12, wherein said engine is a spark ignition engine controlled from a distributor, and further comprising an enhancement circuit initiated by pulses from said distributor for temporarily modifying said electrical output to cause a puff of LPG to be fed into the carburation system.

14. A fluid regulating system according to claim 6, wherein said carburation system has a carburettor which is also suitable for use with petrol, and said supply line leads to a nozzle in the air intake of the carburettor.

15. A fluid regulating system according to claim 14, wherein a drilling is made in the venturi of the carburettor and said second feedback line is connected to said drilling.

16. A fluid regulating system according to claim 14 wherein said second feedback line is connected to an air supply line upstream of an air cleaner connected to the carburettor and said supply line leads to a nozzle in the air cleaner.

17. A fluid regulating system according to claim 6, wherein said supply line, leads to said venturi and said resultant control pressure is derived from the pressure existing at a point in said supply line upstream of said venturi.

* * * * *